Oct. 25, 1955  R. B. OLNEY  2,721,790
LIQUID CONTACTING METHOD AND APPARATUS USING COALESCERS
Filed Nov. 2, 1951  2 Sheets-Sheet 1

Inventor: Richard B. Olney
By: Oswald H. Milmore
His Attorney

Inventor: Richard B. Olney
By: Oswald H. Milmore
His Attorney

United States Patent Office 2,721,790
Patented Oct. 25, 1955

2,721,790

LIQUID CONTACTING METHOD AND APPARATUS USING COALESCERS

Richard B. Olney, Berkeley, Calif., assignor to Shell Development Company, Emeryville, Calif., a corporation of Delaware Application November 2, 1951, Serial No. 254,581

4 Claims. (Cl. 23—310)

This invention relates to the art of contacting two at least partially immiscible liquids having relatively different densities using a succession of partitions with orificial apertures or dispersing plates through which one of the liquids is dispersed into the other to form a dispersion which is settled. The invention may, for example, be applied to solvent extraction processes, wherein a solution such as a hydrocarbon oil is treated with a selective solvent. In such processes, one liquid is flowed countercurrently to the other through a series of stages or contacting zones.

In such processes, the perforated dispersing plates are commonly disposed horizontally within an upright shell and a body of the lighter liquid is established behind each plate, while a body of the heavier liquid is established on the upper side of each plate. The liquid to be dispersed, which may be either the lighter or the heavier one, is then forced through the adjoining plate to form filamentous or laminar streams which, upon entering the other liquid, breaks up to form a dispersion in which the latter liquid forms the continuous phase. This dispersion is settled and the separated liquids are transferred to the next bodies of the same respective liquids in their respective directions of flow, using downspouts or risers, as the case may require, for the liquid which formed the continuous phase; thus, when the lighter liquid is dispersed upwardly, it simply rises through the dispersion to join the body of lighter liquid beneath the next superior plate, while the heavier liquid flows through a downspout to the next lower plate.

Difficulty is frequently experienced in such operations in separating the components of the dispersion, and entrainment of one liquid in the other is an undesirable consequence. Thus, settling is often slow and incomplete at reasonable flow rates and droplets of the dispersed liquids are often entrained in the settled liquid of the continuous phase leaving the settling zone and are carried thereby into the next stage in the direction of flow of the latter liquid; this is opposite to the direction of flow of the dispersed liquid and such entrainment constitutes recycling thereof. Similarly, entrainment of the continuous phase in the other liquid is sometimes experienced.

Such incomplete settling and entrainment greatly reduce the capacity of the apparatus for handling liquids and also have adverse effects on the efficiency of the contacting process. The principal problem is to prevent entrainment of small drops of one liquid in the other liquid from any settling zone and particularly into any zone wherein dispersion is effected, since re-dispersion in the latter zone creates still finer dispersions. These require excessively long settling times and cause repeated recycling of the finely dispersed liquid unless the flow rates through the apparatus are greatly reduced. The prevention of such incomplete settling and consequent entrainment has heretofore necessitated the provision of sizeable settling or disengaging zones between dispersing plates.

It has heretofore been proposed to use coalescers to assist in bringing together the small droplets of the dispersed liquid, thereby promoting coalescence and more rapid settling. These coalescers have, however, been so disposed that only one of the liquids passed entirely through the coalescers, the other liquid or a part thereof after partial separation from the dispersion, being made to reverse its direction of flow in the coalescer and be discharged at the side thereof at which the dispersion entered; in other words, such coalescers acted mainly as knock-back devices somewhat analogous to filters. In other prior arrangements the dispersion was partly settled and only a part thereof was passed through the coalescer.

It is an object of this invention to provide an improved method and apparatus for contacting liquids that are at least partially immiscible and have relatively different densities using perforated partitions wherein improved coalescence is attained by flowing substantially all of the dispersion produced in each stage concurrently through a coalescer provided with a multitude of small flow channels. By such total concurrent flow the contacting of all the finely dispersed droplets with the surfaces of the flow channels in the coalescer is insured and the entrainment of very finely dispersed droplets with any part of the continuous phase is prevented or at least materially reduced.

An important advantage of the method and apparatus according to the invention is that materially greater flow rates through the coalescer are possible. Thus, in prior arrangements wherein all or part of one liquid was taken off on the entry side of the coalescer, flow rates were limited by the need to prevent the entry of any material part of said one liquid into the coalescer; or, when thick coalescers were employed and both liquids entered the coalescers, rates were limited by the need to permit said liquid to reverse its direction of flow and move back toward the entrance side in countercurrent to the other liquid. By concurrent flow through the coalescer this limitation is obviated.

In summary, according to the invention, the fluids are flowed in countercurrent through a series of contacting stages, each stage having a partition with orificial openings arranged in any suitable disposition, e. g., horizontally, vertically or inclined, such partitions being herein called dispersing plates. The dispersing plates may be of any suitable form, such as, for example, metal plates having small apertures, e. g., circular holes ⅛ to ⅜ inch in diameter or slots of like widths, or grids formed by a series of bars mounted with intervening slots of like widths. A body of one of the liquids is established on the corresponding side of each of these plates and a body of the other liquid is established on the other side of each plate. A coalescer, comprising a layer of foraminate material having a substantial thickness, such as 1 to 5 inches, is disposed in spaced relation to each dispersing plate to provide an intervening dispersing zone, the coalescer extending entirely across the passageway for the dispersion flowing from the plate, and a duct is provided for each pair of adjoining coalescers inter-connecting the spaces on the remote sides of the coalescers, said duct functioning as a downspout for the heavier liquid or as a riser for the lighter liquid, depending upon whether the lighter or the heavier liquid is dispersed, respectively. One of the liquids, herein called the first liquid, is passed through each dispersing plate and dispersed into the second liquid, entering as a filamentous or laminar stream (depending upon the shape of the outline of the aperture) and the stream is broken up into droplets by the drag thereon of the second liquid, resulting in a fine dispersion of the first liquid in the second. All of the resulting fine dispersion is then flowed concurrently through the coalescer wherein the dispersed droplets are brought together to form larger drops and a "coalesced" dispersion, i. e., a coarser dispersion, is discharged on the downstream side of the coalescer into a settling zone. The coalesced dispersion settles rapidly in the settling zone and the settled first liquid flows into the body of first liquid in contact with the succeeding dispersion plate in the direction of flow of the first liquid. The settled second liquid in each settling zone enters one of the ducts and flows therethrough into the dispersion zone adjoining a preceding dispersion plate to join and replenish the body of the second liquid therein.

The invention will be further described with reference to the accompanying drawings forming a part of this specification and showing certain specific embodiments by way of illustration and not by way of limitation, wherein.

Figure 1:
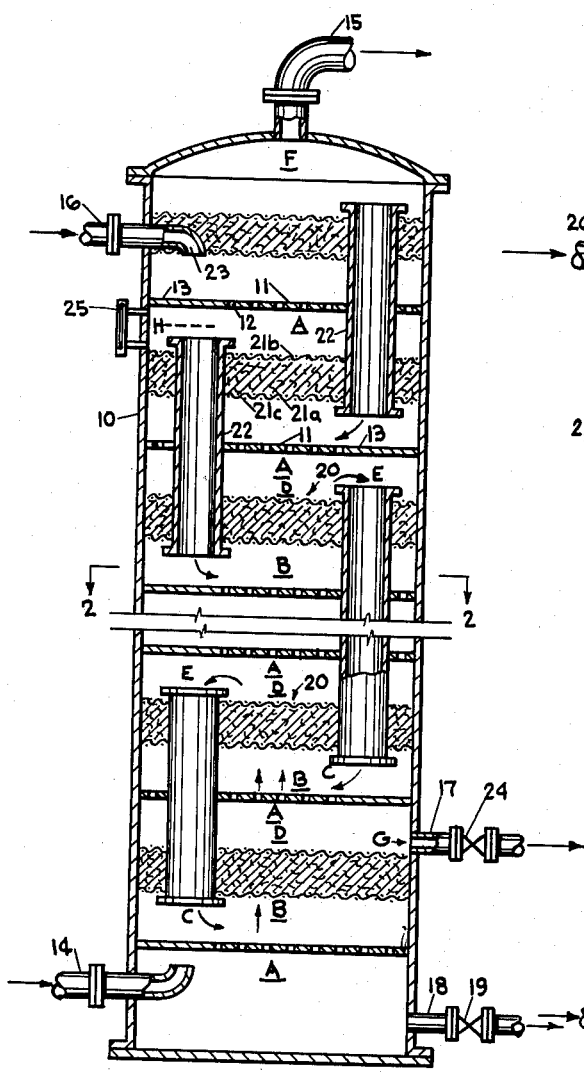
Fig. 1 is a vertical sectional view of a contact column using horizontal dispersing plates and coalescers particularly adapted for dispersing the lighter liquid.
Figure 2:
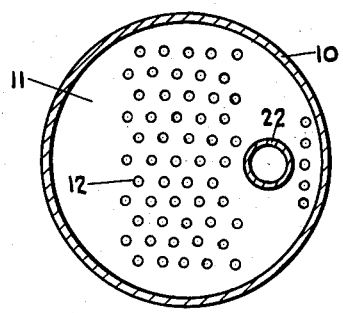
Fig. 2 is a transverse sectional view taken on line 2—2 of Fig. 1.

Referring to Figs. 1 and 2, the apparatus comprises a vertical, cylindrical shell 10 having a plurality of dispersing plates in the form of horizontal partitions 11 extending across the full cross-sectional area of the shell and having circular perforations 12 throughout substantially the entire area of the partition, preferably with the exception of the region 13 beneath the downcomer duct from the plate above which will be described. The shell has an inlet 14 and an outlet 15 at the bottom and top, respectively, for the lighter liquid, an inlet 16 and an outlet 17 spaced somewhat from the top and bottom, respectively, for the heavier liquid. A drain line 18 with a normally closed valve 19 is connected to the bottom. A coalescer 20 of foraminate material extends across the full area of the shell in vertically spaced relation above each partition, i. e., downstream from each dispersing plate in the direction of flow of the lighter liquid. Such a coalescer may, for example, comprise a body of fibrous packing, such as glass wool 21a, held between retaining screens 21b and 21c, or a laminar structure produced by assembling a plurality of screens, etc. The expression "foraminate material" is intended to denote any such reticulate or finely apertured substance providing a multitude of fine passages. The space between each dispersing plate and the coalescer above it is a confined dispersing zone indicated at B in the drawing, and the space above each coalescer is a settling zone, indicated at D.

A return duct 22 for the settled continuous phase liquid extends through each partition and through the two neighboring coalescers to place the settling space above each coalescer except the bottom one into communication with the space immediately below the next lower coalescer. In other words, each settling zone communicates with the dispersing zone on the upstream side of the coalescer which is immediately upstream from the adjoining coalescer, "upstream" having reference to the direction of flow of the liquid that is dispersed, which is in this instance the ascending lighter liquid. In the embodiment described, these ducts function as downcomers. Ducts 22 of neighboring partitions are seen to overlap in vertical extent, requiring lateral displacement; they are preferably located at extreme sides of their partitions as shown, in staggered relation. It will be noted that the inlet 16 has a spout 23 located to discharge heavier liquid onto the uppermost tray beneath the top coalescer, while the outlet 17 has its connection with the column just above the lowermost coalescer, and has a valve 24 to regulate the rate of discharge of heavier liquid.

In operation the lighter and heavier liquids are continuously introduced at 14 and 16, respectively. A layer of light liquid collects at the top of each settling zone immediately beneath each perforated tray, indicated at A, while heavier liquid collects in the dispersing zones B, above each perforated tray, as a body of substantial thickness, both layers being in contact with the tray. Thus, there is established a series of bodies alternately consisting essentially of lighter and heavier liquids, each body of heavier liquid being contained in a dispersing zone. Sufficient pressure is applied to cause the lighter liquid to flow upwards through the perforations 12 and to emerge therefrom as fine jets or streams with sufficient velocity to be broken up into small droplets upon flow through the heavier liquid, being thereby dispersed. Thus, the heavier liquid constitutes the continuous phase of the resulting dispersion. It will be seen, therefore, that when the column is in operation, the liquid at A consists essentially of pure lighter liquid while the liquid in the zone B is a fine dispersion. The fine dispersion above each tray flows upwardly into the adjoining coalescer, being displaced by subsequent portions of lighter liquid forced up through the perforations and by the settled heavier liquid admitted from the bottom of the respective downcomer duct 22, as indicated at C (from the spout 23 in the case of the uppermost tray). It flows through the coalescer wherein the dispersed droplets of light liquid are coalesced to form larger droplets. This changes the fine dispersion into a coarse dispersion. The latter emerges from the top of the coalescer into the settling zone D and settles readily, the lighter liquid rising to become a part of the layer A and replenishing thereby the liquid that flows upwards through the perforations, while the heavier liquid escapes into the downcomer duct 22 as indicated at E. It is evident that the lighter liquid settled in each settling zone is commingled with the body of lighter liquid next in the direction of flow of the lighter liquid and that the heavier liquid settled in each settling zone is transferred to the dispersing zone next beyond the dispersion zone from which it was derived in the direction of flow of the heavier liquid. In the case of the uppermost coalescer the settled lighter liquid forms a continuous layer at F from which treated lighter liquid is discharged through the outlet 15, while in the case of the lowermost coalescer the settled heavier liquid flows out through the outlet 17 as indicated at G. The valve 24 is set to maintain the interphase level a short distance below each partition, as indicated at H; this level may be observed by means of a sight glass 25. The heavier liquid emerging at C from each duct and from the spout 23 flows across the upper face of the partition to replenish continuously the continuous phase.

It is evident that in the operation of this device all components of the fine dispersion are required to flow from the dispersing zone B concurrently through the coalescer in the course of flow into the settling zone D.

Figure 3:
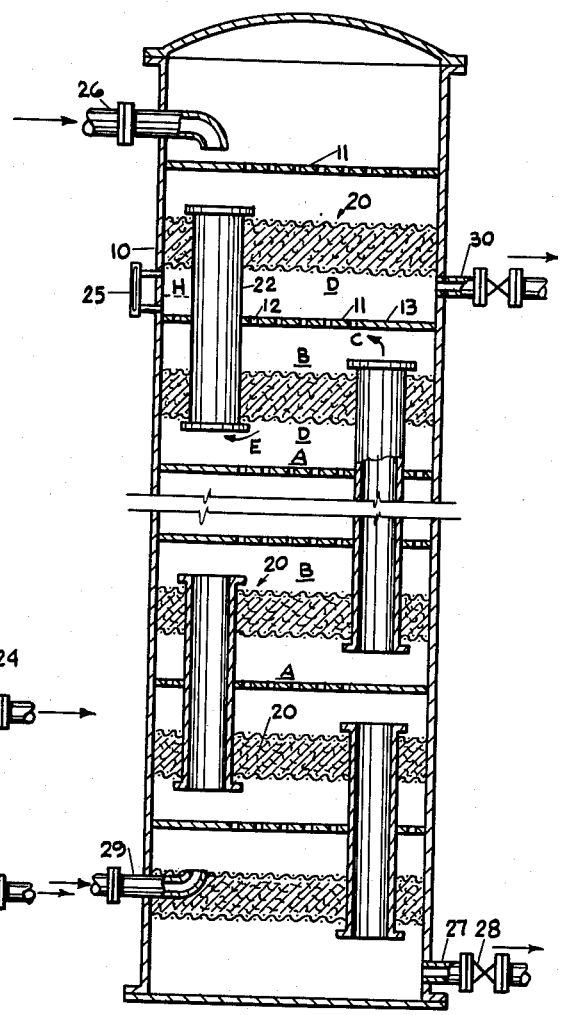
Fig. 3 is a view similar to Fig. 1 of a modification suitable for dispersing the heavier liquid.

The invention may also be applied to cases where the heavier liquid is dispersed in the lighter liquid. In this case, the arrangements within the column are as described above but the entire column is inverted and the withdrawal of liquid is preferably regulated at the bottom. Such an arrangement is indicated in Fig. 3, wherein like reference numbers indicate like parts and each partition 11 has a coalescer 20 beneath it in vertically spaced relation. The fresh heavier liquid is supplied through an inlet 26 above the uppermost partition and contacted heavier liquid is withdrawn through an outlet 27 at the bottom at a rate controlled by a valve 28. Fresh lighter liquid is admitted through an inlet 29 to the space immediately above the lowermost coalescer and treated lighter liquid is withdrawn through an outlet 30 from the settling space immediately below the uppermost coalescer. It may be noted that in this instance a continuous layer of substantially pure heavier liquid forms above and in contact with each partition and flows downwardly through the perforations and enters a body of lighter liquid immediately beneath the partition as fine jets to form a fine dispersion, and that the space above each coalescer is a dispersing zone while that beneath each coalescer is the settling zone into which the coarse dispersion flows downwardly from the respective coalescer.

Figure 4:
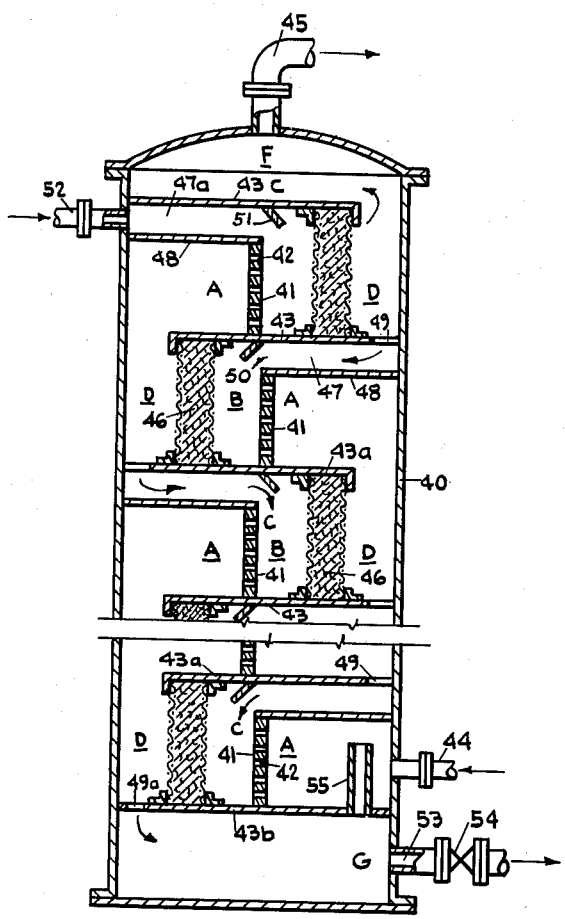
Fig. 4 is a vertical sectional view of a contact column using vertical dispersing plates and coalescers, adapted for dispersing the lighter liquid.

As was noted above, it is not necessary to employ horizontal perforated partitions or dispersing plates and other arrangements may be used, retaining, however, the same flow relation. Fig. 4 illustrates an embodiment using vertical partitions and adapted for dispersing the lighter liquid. In this view the column 40 is compartmented by means of vertical dispersing plates 41 having circular perforations 42 and horizontal partitions 43, so as to form a continuous series of chambers A that are inter-connected through the perforations 42 for the flow of the lighter liquid along a continuous flow path from the inlet 44 at the bottom to the outlet 45 at the top. The partitions 43 are seen to extend from one wall of the column beyond the dispersing plates to provide extensions 43a. Downstream from each dispersing plate in the direction of flow of the lighter liquid there is a vertical coalescer 46 formed of foraminate material, such as was described above, extending across the full area of the passageway leading away downstream from the dispersing plate, and defining a dispersing zone B between itself and the respective dispersing plate. The space downstream from each coalescer, indicated at D, is a settling zone. The bottom of each settling zone is connected to the dispersing zone on the upstream side of the coalescer which is immediately upstream of the neighboring coalescer by a duct 47, "upstream" again having reference to the flow of the liquid that is dispersed. This duct is defined by a lower wall 48 and a partition 43 and communicates with the settling and dispersing zones through openings 49 and 50, respectively in the partition 43 and above the dispersing plate. The opening 50 is advantageously wide, e. g., it may extend across the full length of the dispersing plate so as to discharge heavy liquid in close proximity thereto and is optionally provided with a baffle 51 to deflect the heavier liquid downwards. It will be noted that the ducts 47 are in exactly the same flow relation to the coalescers and dispersing plates as the ducts 22 in the previous embodiments in that they inter-connect spaces on remote sides of each pair of adjacent coalescers. The uppermost duct 47a is connected to an inlet 52 through which heavy liquid is admitted. The opening 49a in the lowermost partition 43b communicates with a final settling space G within which more complete settling takes place prior to discharging the heavy liquid from the column through an outlet 53 at a rate controlled by the valve 34. Any light liquid that was entrained into the space G and settled therein flows upwards into the first chamber A through a riser tube 55.

The operation of the device in Fig. 4 is similar to that previously described. Thus, a body of light liquid accumulates in each chamber A and flows through the adjoining dispersing plate 41 to be dispersed in the heavier liquid within the dispersing zone B, the latter being continuously replenished by flow from the downcomer ducts 47 as indicated at C. All of both components of the resulting fine dispersion flow through the adjoining coalescer and the resulting coarse dispersion flows into the adjoining settling zone D from which the settled heavier liquid flows through the opening 49 or 49a and the settled lighter liquid rises into the next higher chamber A. In the case of the uppermost settling zone the settled lighter liquid rises to the space F above the uppermost partition 43c; this space serves as a final settler from which any entrained heavier liquid may return to the settling zone D.

It is evident that the arrangement of Fig. 4 may also be adapted for dispersing the heavier liquid by inverting the column, as was described for Fig. 3.

Figure 5:
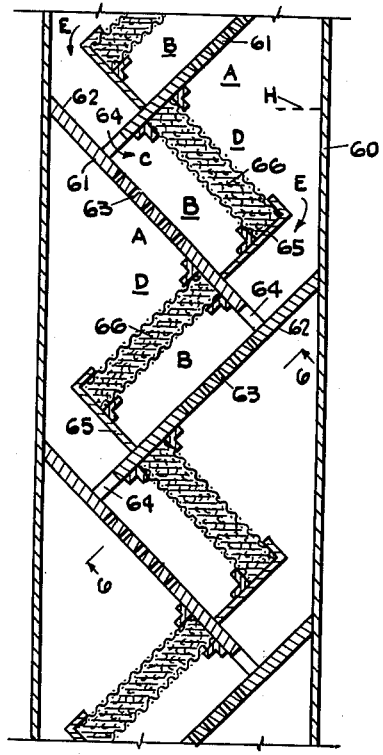
Fig. 5 is a fragmentary vertical sectional view showing a part of a contact column using inclined dispersing plates and coalescers.
Figure 6:
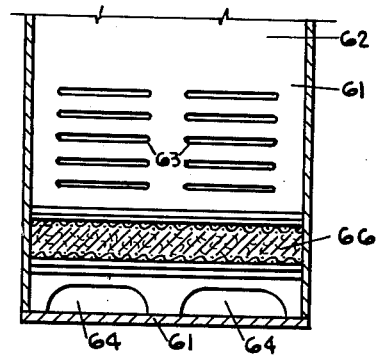
Fig. 6 is a section taken on line 6—6 in Fig. 5.

Figs. 5 and 6 illustrate two further variants, viz., the use of inclined dispersing plates and the use of plates having slots instead of circular openings, it being understood that each of these variants may be applied individually if desired. In this embodiment, the column 60 has a plurality of inclined plates 61, each plate having the lateral edges sealed to the column wall and extending from the column wall at the upper end of the plate to the next lower plate, being joined near the top of the latter to leave an imperforate part 62 between the column wall and the juncture. Each plate has a plurality of slots 63 at the intermediate area of the plate, and one or more openings 64 at the lowermost part of the plate, this opening preferably extending continuously or intermittently across the entire width of the plate as shown in Fig. 6 to distribute heavier liquid. An auxiliary partition 65 extends upwardly from each plate from the part between the openings 64 and the slotted part and has its lateral edges sealed to the column wall. A coalescer 66 is mounted substantially parallel to and above each plate, being connected to the partition 65 and to the next higher plate 61 at its lower and upper margins, and sealed to the column wall at its lateral edges. Thus, each slotted portion of a plate 61 and the partition 65 and coalescer 66 associated therewith define a confined dispersing zone B. The inlets and outlets at the ends of the column may be as described for the previous embodiments.

In operation, ascending light liquid accumulates to a level H at the bottom of the slotted part of each partition in the zone indicated at A and heavier liquid flows through the openings 64 into the dispersing spaces B as indicated at C. The lighter liquid flows through the slots and becomes dispersed in the heavier liquid, the resulting fine dispersion flowing through the coalescer into the adjoining settling zone D. The resulting coarse dispersion settles in the latter zone and settled lighter liquid ascends to replenish the lighter liquid in the part A while settled heavier liquid descends into the channels beneath the partitions 65 as indicated at E, these channels functioning as downcomer ducts.

I claim as my invention:

1. Method of intimately contacting first and second at least partially immiscible liquids having relatively different densities wherein said liquids are flowed progressively in opposite directions through a series of dispersing and settling zones which comprises the steps of establishing a series of bodies alternately consisting essentially of the first and second liquids, each body of second liquid being contained in a dispersing zone; dispersing liquid from each of said bodies of a first of said liquids into the body of the second liquid adjoining in the direction of flow of the first liquid to produce a fine dispersion in the dispersing zone containing the respective body of second liquid; flowing substantially all components of the said fine dispersion from the each dispersing zone concurrently through a coalescing zone of substantial thickness providing a multitude of small flow channels and thereby converting the each fine dispersion into a coarse dispersion; discharging the resulting coarse dispersion from each coalescing zone into a settling zone and therein settling the two liquids; commingling the first liquid settled in each settling zone with the body of first liquid next in the direction of flow of the first liquid; and transferring the second liquid settled in each settling zone to the dispersing zone next beyond the dispersing zone from which it was derived in the direction of flow of the second liquid.

2. Method of intimately contacting first and second at least partially immiscible liquids having relatively different densities wherein said liquids are flowed progressively in opposite directions through a series of dispersing zones and settling zones, the first of said liquid being dispersed into a continuous body of the second liquid in each said dispersing zone by flow as a plurality of small streams through orificial openings in a dispersing plate, which method comprises the steps of establishing at each of said dispersing plates a body of the first liquid in contact with one side thereof and a body of substantial thickness of the second liquid in contact with the other side thereof, the said bodies of second liquid being contained in dispersing zones and the two bodies of different liquids between each adjacent dispersing plate being separated by a settling zone; dispersing liquid from each of said bodies of first liquid through the openings in the dispersing plate in contact therewith into the body of second liquid on the other side of said plate to form a fine dispersion in the dispersing zone; flowing all components of said fine dispersion from each dispersion zone concurrently through a coalescing zone of substantial thickness providing a multitude of small flow channels and thereby converting each fine dispersion into a coarse dispersion; discharging the resulting coarse dispersion from each coalescing zone into the settling zone next in the direction of flow of the first liquid and therein settling the two liquids; commingling the first liquid settled in each settling zone with the body of first liquid in contact with the dispersing plate next in the direction of flow of the first liquid; and transferring the second liquid settled in each settling zone to the dispersing zone next beyond the dispersing zone from which it was derived in the direction of flow of the second liquid.

3. Apparatus for contacting two at least partially immiscible liquids of relatively different densities comprising a series of spaced dispersing plates having orificial openings for the passage of one of said liquids as a plurality of small streams; enclosing wall means defining a confined flow channel for constraining said one liquid to flow successively through said plates; spaced inlet means for admitting said liquids to opposite ends of said flow channel; spaced outlet means for discharging said liquid from opposite ends of said flow channel; a coalescer comprising a layer of foraminate material having substantial thickness spaced downstream from each dispersing plate with regard to the flow of said one liquid and defining between itself and the neighboring dispersing plate upstream thereto a dispersing zone, said coalescer extending fully across said flow channel whereby all components of a dispersion in said dispersing zone must flow concurrently through said coalescer, said coalescer being spaced from the downstream neighboring dispersing plate to provide an intervening settling zone; and a return duct interconnecting each settling zone to the dispersing zone on the upstream side of the coalescer which is immediately upstream from the coalescer adjoining the respective settling zone.

4. Apparatus for contacting two at least partially immiscible liquids of relatively different densities comprising an upright shell; liquid inlets for said liquids near the top and bottom, respectively; liquid outlets near the top and bottom, respectively; a plurality of vertically spaced trays within and extending across the shell and subdividing the shell into a vertical series of compartments; a plurality of orificial openings in each tray for the passage of one of said liquids as a plurality of small streams; a coalescer comprising a layer of foraminate material providing a multitude of fine flow channels for the passage of a fine dispersion disposed in spaced relation to a common side of each of said trays to form an intervening dispersing zone, said coalescer extending across the shell whereby all components of a dispersion in each dispersing zone must flow concurrently through the adjacent coalescer, said coalescer being spaced from the next higher tray to provide an intervening settling zone; and a return duct inter-connecting the space contiguously above each coalescer to the space contiguously beneath the next lower coalescer.

References Cited in the file of this patent

UNITED STATES PATENTS

| | | |
|---|---|---|
| 1,748,411 | Cooke | Feb. 25, 1930 |
| 1,748,595 | Chillas, Jr., et al. | Feb. 25, 1930 |
| 2,106,366 | Tijmstra | Jan. 25, 1938 |
| 2,271,462 | Pfennig | Jan. 27, 1942 |
| 2,274,030 | Atkins, Jr. | Feb. 24, 1942 |